United States Patent
Gest

[11] Patent Number: 6,078,323
[45] Date of Patent: Jun. 20, 2000

[54] METHOD AND SYSTEM FOR RAPIDLY ACCESSING GRAPHICALLY DISPLAYED TOOLBAR ICONS VIA TOOLBAR ACCELERATORS

[75] Inventor: Stephen Brent Gest, Austin, Tex.

[73] Assignee: International Business Machines Corporation, Armonk, N.Y.

[21] Appl. No.: 09/056,884

[22] Filed: Apr. 9, 1998

[51] Int. Cl.[7] .................................................. G06F 3/14
[52] U.S. Cl. .......................... 345/348; 345/172; 345/338; 345/354; 345/357
[58] Field of Search ................................... 345/348, 354, 345/338, 336, 352, 353, 339, 357, 168, 172

[56] References Cited

U.S. PATENT DOCUMENTS

| | | | |
|---|---|---|---|
| 5,287,448 | 2/1994 | Nicol et al. ............................. | 345/337 |
| 5,438,331 | 8/1995 | Gilligan et al. ........................ | 341/35 |
| 5,522,071 | 5/1996 | Guillen et al. ......................... | 395/650 |
| 5,525,978 | 6/1996 | York et al. ............................... | 341/22 |
| 5,551,055 | 8/1996 | Matheny et al. ....................... | 395/882 |
| 5,617,527 | 4/1997 | Kressin et al. ......................... | 345/326 |
| 5,694,562 | 12/1997 | Fisher ..................................... | 345/349 |
| 5,748,927 | 5/1998 | Stein et al. ............................. | 345/333 |
| 5,796,404 | 8/1998 | Gentner .................................. | 345/352 |
| 5,828,376 | 10/1998 | Solimene et al. ...................... | 345/352 |

*Primary Examiner*—Raymond J. Bayerl
*Assistant Examiner*—Cuong T. Thai
*Attorney, Agent, or Firm*—David A. Mims, Jr.; Michael R. Barre; Andrew J. Dillon

[57] ABSTRACT

A method and system for rapidly accessing viewable graphic icons displayed in a graphic interface within a computer system, wherein the viewable graphic icons are normally selected utilizing a pointing device. Initially, the graphic objects are displayed within the graphic interface, such that the viewable graphic icons may be manipulated by a user to initiate the performance of application functions. An associated accelerator object comprising one or more designated keystrokes, is then displayed proximate to each viewable graphic icon, wherein the associated accelerator objects and/or any "flyover" help, when activated by the user, initiate the performance of application functions associated with the viewable graphic icons, such that any one of the application functions may be rapidly and efficiently selected without the use of a pointing device or searching for accelerator objects maintained in hidden regions within the graphic interface.

9 Claims, 8 Drawing Sheets

METHOD AND SYSTEM FOR RAPIDLY ACCESSING GRAPHICALLY DISPLAYED TOOLBAR ICONS VIA TOOLBAR ACCELERATORS

BACKGROUND OF THE INVENTION

1. Technical Field

The present invention relates to improved information-retrieval methods and systems. In particular, the present invention relates to improved information-retrieval methods and systems utilized in association with graphical user interfaces. More particularly, the present invention relates to improved methods and systems for graphically displaying toolbar icons within graphical user interface applications. Still more particularly, the present invention relates to techniques for rapidly accessing such graphically displayed toolbar icons during processing of graphical user interface applications.

2. Description of the Related Art

A graphical user interface is a type of display format which enables a user to choose commands, start programs, and see lists of files and other options by pointing to pictorial representations and lists of menu items on a computer display screen. Choices can generally be activated by either a keyboard or a pointing device, such as a mouse. A mouse is a commonly utilized pointing device, containing one or more buttons, that allows a user to interact with a product or operating environment such as a graphical user interface.

Some conventional graphical user interfaces (also referred to as a "graphic interface") provide a cursor and scroll bar for scrolling through portions of a viewable object. A viewable object can contain multiple components such as spreadsheets, text, hotlinks, pictures, sound, and video objects. However, a viewable object is not limited to these components. In many types of graphical user interfaces, a vertical or horizontal bar at the side or bottom of a graphical user interface window can be utilized in conjunction with a pointing device such as a mouse, trackball, or stylus to move about in a viewable object. Scrolling permits viewing of any desired portion of a viewable object and is so named because it is the electronic equivalent of reading through a rolled (i.e., scrolled) viewable object rather than flipping through pages of a book.

So-called "toolbars" are utilized in many graphical user interface applications. Toolbars are groupings of graphically displayed buttons that perform a common set of functionality within a graphical user interface application. For example, in the case of a word processor application, the word processor may include a group of buttons within a particular toolbar that allow a user to "cut," and "paste." A "cut" function allows a user to remove a portion of a document or file, usually placing the "cut" portion in memory so that this portion can be "pasted" (i.e. inserted) elsewhere. Normally, a user can access these buttons utilizing a mouse. However, users who rely on a keyboard for their input for a particular application are at a disadvantage compared to users who rely on a mouse for input.

Keyboard users simply do not have quick and immediate access to the function provided by a particular toolbar button, unlike their mouse-user counterparts who simply have to click on the button with their mouse button. Such mouse-user counterparts also have easy access to automatic "flyover" help, a graphical user interface technique of displaying keywords which describe particular icons or graphical buttons as the user passes a mouse pointer over those particular icons or graphical buttons. Such flyovers are described in greater detail herein. Users who fall into the category of primary keyboard users include those with disabilities who may be unable to properly use a mouse, users without a mouse as an input device, or simply those users who actually prefer to use the keyboard as their only input device, so that they are not constantly moving back and forth between the keyboard and the mouse.

Currently, the only "quick" access to toolbar button functionality that such primary keyboard users have available to them includes either repetitive tabbing toward the toolbar button itself, followed by pressing "ENTER," or looking for the function somewhere under a menubar menu and using an accelerator key to invoke that function. The problems with the first method are that the application may or may not support tabbing within the toolbar, and a user can easily tab over too far and miss the targeted button.

The problem with the second method is that it involves a lengthy search of the menubar menus, provided the developer actually placed access to the function with the menus and the user can correctly translate the toolbar icon to the textual name of the function. For example, an icon representing scissors would access the same function within the menus under "cut." What is needed is a quick access to the toolbar buttons within an application's toolbar that does not require any guesswork or excessive searching on the part of primary keyboard users of such an application.

With respect to the foregoing needs, the inventors are aware of no attempts to date which have been directed toward satisfying the foregoing identified needs. Thus, it is apparent that a need exists for an apparatus and method that provides rapid and efficient access to particular toolbar functionality via a keyboard input device. It is believed the invention disclosed herein provides a solution to these heretofore unmet needs.

SUMMARY OF THE INVENTION

It is therefore an object of the invention to provide an improved information-retrieval method and system.

It is another object of the invention to provide improved information-retrieval methods and systems utilized in association with graphical user interfaces.

It is still another object of the invention to provide an improved method and system for graphically displaying toolbar icons within graphical user interface applications.

It is yet another object of the invention to provide techniques for rapidly accessing graphically displayed toolbar icons during processing of graphical user interface applications without relying on a pointing device or excessive keyboard input.

The above and other objects are achieved as is now described. A method and system for rapidly accessing viewable graphic icons displayed in a graphic interface within a computer system, wherein the viewable graphic icons are normally selected utilizing a pointing device. Initially, the graphic objects are displayed within the graphic interface, such that the viewable graphic icons may be manipulated by a user to initiate the performance of application functions. An associated accelerator object comprising one or more designated keystrokes, is then displayed proximate to each viewable graphic icon, wherein the associated accelerator objects and/or any "flyover" help, when activated by the user, initiate the performance of application functions associated with the viewable graphic icons, such that any one of the application functions may be rapidly and efficiently selected without the use of a pointing device or searching for accelerator objects maintained in hidden regions within the graphic interface.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

FIG. 1(b), is a pictorial representation of a notebook-based computer system, which may be utilized to implement an alternative preferred embodiment of the present invention.

DETAILED DESCRIPTION OF PREFERRED EMBODIMENT

Figure 1A:
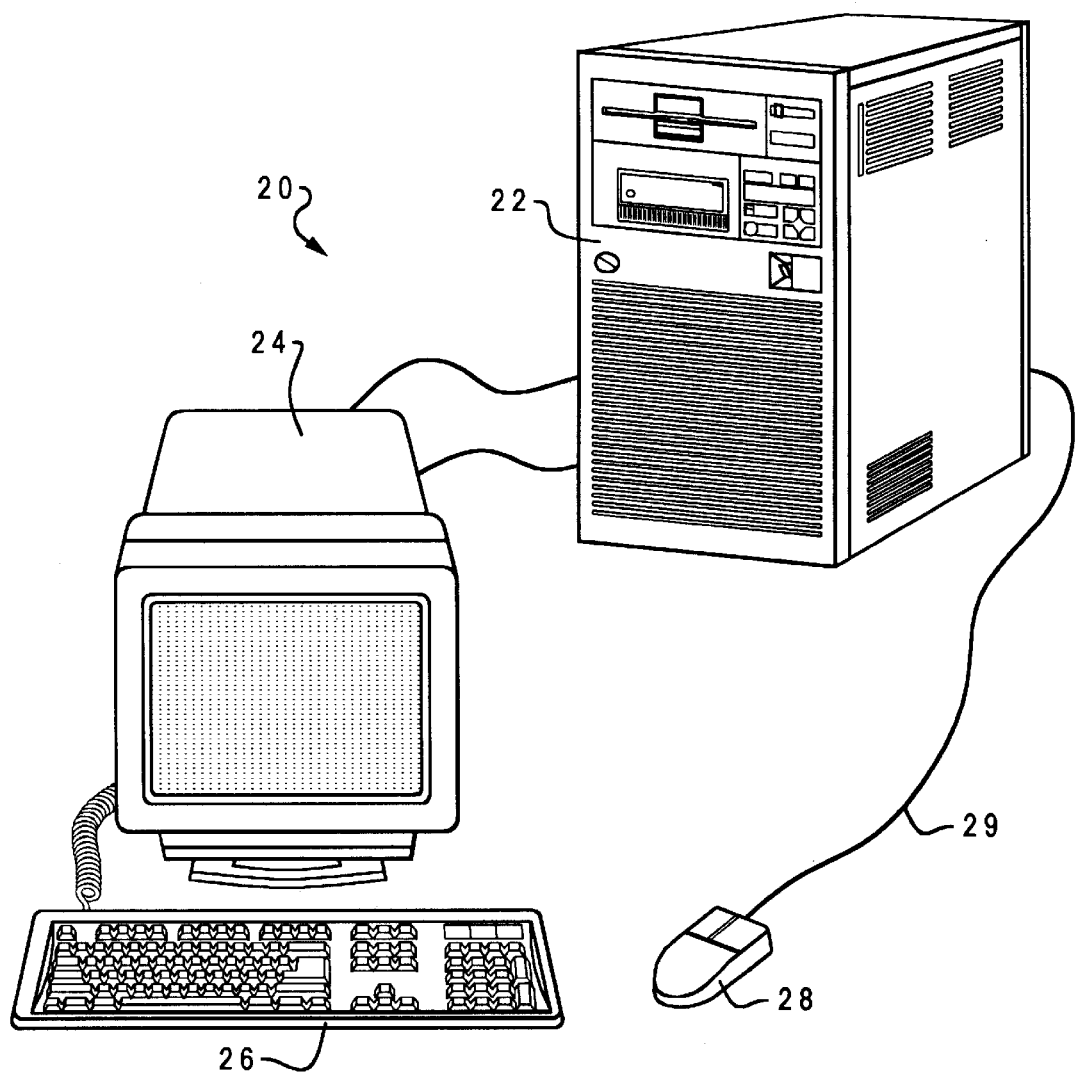
FIG. 1(a) illustrates a pictorial representation of a computer system, which may be utilized to implement a preferred embodiment of the present invention.
Figure 16:
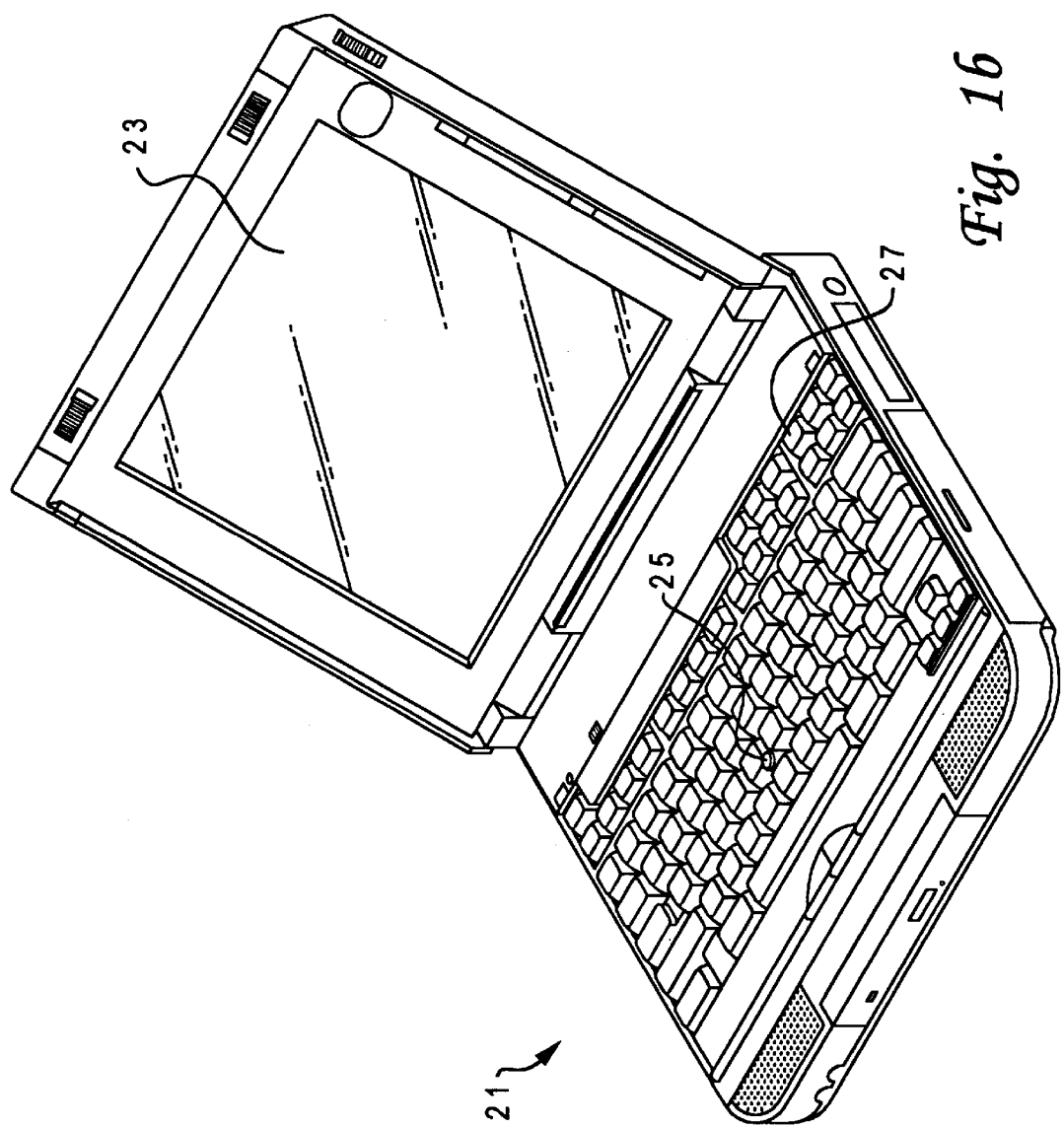

With reference now to the figures and in particular with reference to FIG. 1(a), there is depicted a pictorial representation of a computer system, which may be utilized to implement a preferred embodiment of the present invention. A computer system 20 is depicted that includes a system unit 22, a video display 24, a keyboard 26, and a mouse 28. Computer system 20 can be implemented utilizing any suitable computer such as the AS/400 computer system, IBM SYSTEM RISC/6000, or a personal computer. The AS/400 computer system and the IBM SYSTEM RISC/6000 are products of International Business Machines Corporation, located in Armonk, N.Y. Although the depicted embodiment involves a personal computer, a preferred embodiment of the present invention can be implemented in other types of data-processing systems, such as, for example, intelligent workstations, mini-computers, or "notebook" computers such as the configuration depicted in FIG. 1(b) herein. Those skilled in the art will also appreciate, of course, that computer system 20 may also be implemented as a "laptop" or "notebook" computer, well known in the computer arts. Computer system 20 includes a graphical user interface that resides within a machine-readable media to direct the operation of computer system 20. Those skilled in the art will appreciate that the method and system of the present invention apply equally to any computer system, regardless of whether the computer system is a complicated multi-user computing apparatus or a single-user workstation.

Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display 24. Keyboard 26 includes a standard set of printable characters presented in a QWERTY pattern typical of most typewriters. In addition, keyboard 26 may include a calculator-like numeric keypad at one side and additional specialized keys. Some of these keys, such as the "Control," "Alt," and "Shift" keys may be utilized to change the meaning of another key. Other special keys and combinations of keys can be utilized to control program operations or to move either text or cursor on the display screen of video display 24.

Mouse 28 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 29 connects mouse 28 to a computer such as computer system 20. By moving mouse 28 on a surface (e.g, a desk surface or a mouse pad), the user typically controls an on-screen cursor. Such a mouse is a relative pointing device, because the mouse's movement is not defined by limitations, and also because its placement on a surface does not map directly to a specific location on a computer screen. Generally, to select items or choose commands on a screen displayed graphical user interface, the user presses one or more mouse buttons, producing a so-called mouse "click."

The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons. Although mouse 28 is described as a pointing device which may be utilized in accordance with a preferred embodiment of the present invention, those skilled in the art will appreciate that other pointing devices can also be utilized in association with a preferred embodiment of the present invention. One type of pointing device that may be utilized in association with a preferred embodiment is the IBM TrackPoint II™. Thus, mouse 28 is not a necessary feature of the present invention, but is presented for illustrative purposes only.

FIG. 1(b), is a pictorial representation of a notebook-based computer system 21, which may be utilized to implement an alternative preferred embodiment of the present invention. Those skilled in the computer arts will appreciate that computer system 21 is a "notebook" or "laptop" version of computer system 20 depicted in FIG. 1(a). An example of a notebook-based implementation of computer system 21 includes the IBM ThinkPad™ product described herein. Computer system 21 includes a keyboard 27 which is analogous to keyboard 26 depicted in FIG. 1(a). Although not depicted in FIG. 1(b) a system unit analogous to system unit 22 is included internally within computer system 21. FIG. 1(b) further includes a video display 23 and a pointing device 25. Pointing device 25 is not a mouse. Instead, pointing device 25 may be implemented as an IBM Track-Point II™ as described herein, or other notebook-based pointing devices well known in the computer arts.

Figure 2:
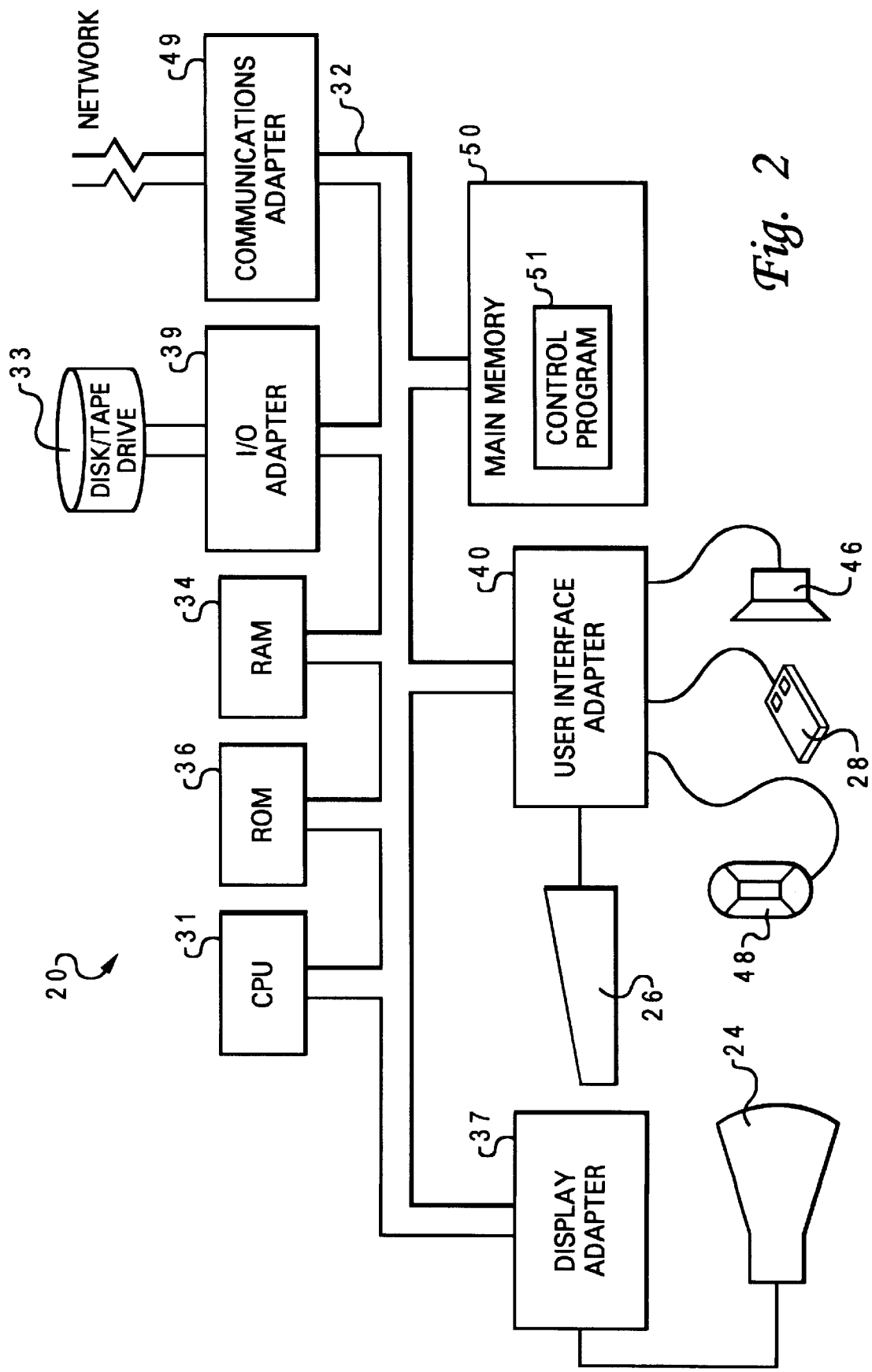
FIG. 2 depicts a representative hardware environment of a computer system, which may be utilized to implement a preferred embodiment of the present invention.

FIG. 2 depicts a representative hardware environment of a computer system, which may be utilized to implement a preferred embodiment of the present invention. Computer system 20 includes a Central Processing Unit ("CPU") 31, such as a conventional microprocessor, and a number of other units interconnected via system bus 32. Computer system 20 includes random-access memory ("RAM") 34, read-only memory ("ROM") 36, display adapter 37 for connecting system bus 32 to video display 24, and I/O adapter 39 for connecting peripheral devices such as disk and tape drives 33 to system bus 32.

Disk and tape drives 33 are electro-mechanical devices that read from and write to disks. The main components of a disk drive include a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 20. A disk itself is typically a round, flat piece of flexible plastic (e.g., floppy disk) or inflexible metal (e.g. hard disk) coated with a magnetic material that can be electrically influenced to hold information recorded in digital (i.e., binary) form. A disk is, in most computers, the primary method for storing data on a permanent or semipermanent basis. Because the magnetic coating of the disk must be protected from damage and contamination, a floppy (e.g., 5.25 inch) disk or micro-floppy (e.g., 3.5 inch) disk is encased in a protective plastic jacket. A hard disk, which is very finely machined, is typically enclosed in a rigid case and can safely be exposed only in a dust free environment.

Video display 24 provides the visual output of computer system 20. Video display 24 can be, for example, a CRT-based video display well-known in the art of computer hardware. "CRT" is an acronym for cathode-ray tube. With a portable or notebook-based computer such as computer system 21 of FIG. 1(b), video display 24 can be replaced with an LCD-based or a gas plasma-based flat-panel display. "LCD" is an acronym for liquid crystal display. Those skilled in the art can thus appreciate that computer system 20 may be modified to be implemented as a notebook-based computer, such as computer system 21 depicted in FIG. 1(b). Computer system 20 further includes user interface adapter 40 for connecting keyboard 26, mouse 28, speaker 46, microphone 48, and/or other user interface devices, such as a touch screen device (not shown), to system bus 32. Communications adapter 49 connects computer system 20 to a computer network. Although computer system 20 is shown to contain only a single CPU and a single system bus, it should be understood that the present invention applies equally to computer systems that posses multiple CPUs and to computer systems that include multiple buses that each perform different functions in different ways.

Computer system 20 also includes a graphical user interface that resides within a machine-readable media to direct the operation of computer system 20, or as those skilled in the art will appreciate, computer system 21 depicted in FIG. 1(b). Any suitable machine-readable media may retain the graphical user interface, such as RAM 34, ROM 36, a magnetic diskette, magnetic tape, or optical disk (the last three being located in disk and tape drives 33). Any suitable operating system and associated graphical user interface (e.g., Microsoft Windows) may direct CPU 31. For example, the AIX operating system and AIXwindows windowing system (i.e., graphical user interface) can direct CPU 31. The AIX operating system is IBM's implementation of the UNIX operating system. UNIX is a trademark of UNIX Systems Laboratories, Inc. Other technologies can also be utilized in association with CPU 31, such as touch-screen technology or human voice control. Those skilled in the art will appreciate that the hardware depicted in FIG. 2 may vary for specific applications. For example, other peripheral devices such as optical disk media, audio adapters, or chip-programming devices, such as PAL or EPROM programming devices well-known in the art of computer hardware, and the like may be utilized in addition to or in place of the hardware already depicted.

Main memory 50 is connected to system bus 32, and includes a control program 51 that resides within main memory 50 and contains instructions that when executed on CPU 31, carry out the operations depicted in the logic flow chart described herein. The computer program product can also be referred to as a program product. It is important that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution.

Examples of signal-bearing media include: recordable-type media, such as floppy disks, hard disk drives and CD ROMs, and transmission-type media such as digital and analog communication links. Examples of transmission-type media include devices such as modems. A modem is a type of communications device that enables a computer to transmit information over a standard telephone line. Because a computer is digital (i.e., works with discrete electrical signals representative of binary 1 and binary 0) and a telephone line is analog (i.e., carries a signal that can have any of a large number of variations), modems can be utilized to convert digital to analog and vice-versa. The term "media" as utilized herein is a collective word for the physical material such as paper, disk, CD-ROM, tape and so forth, utilized for storing computer-based information.

Figure 3:
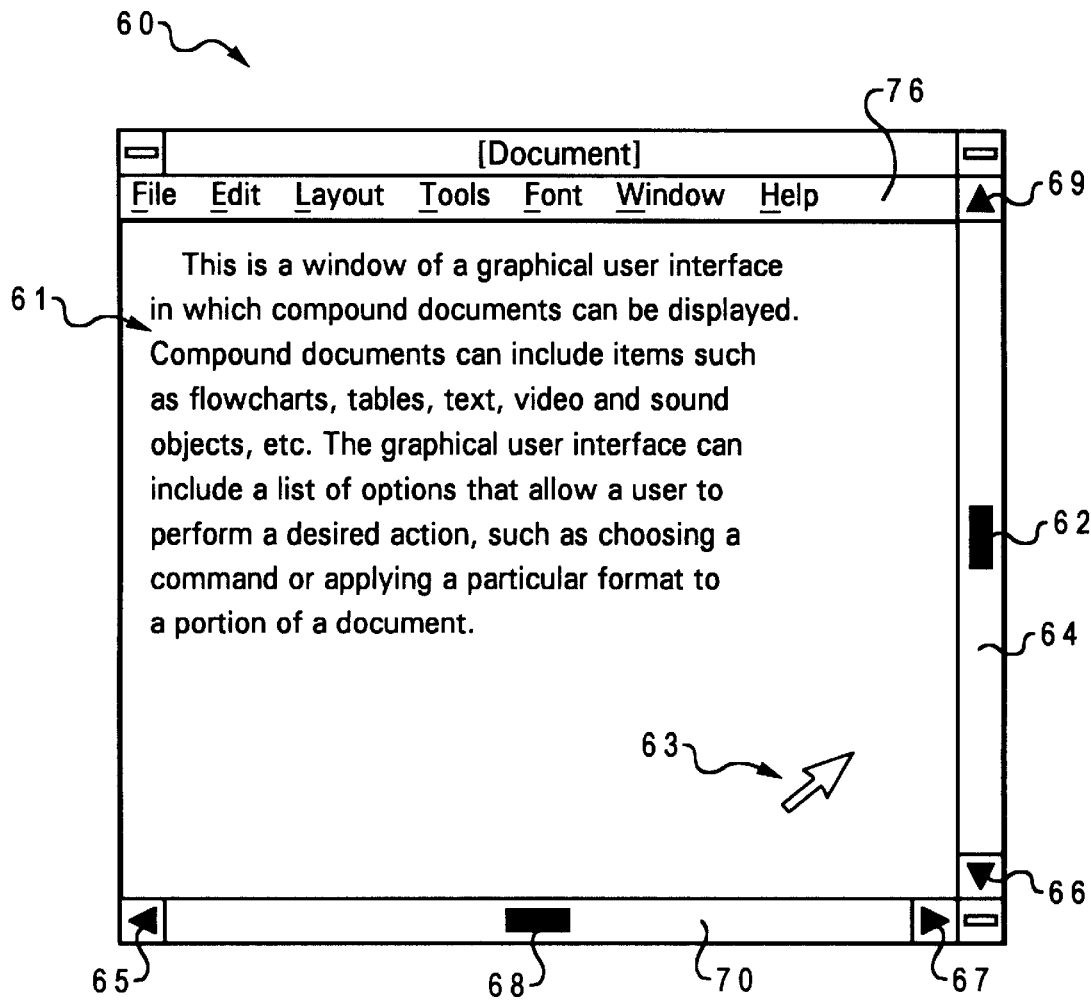
FIG. 3 illustrates a pictorial representation of a graphical user interface window in accordance with a preferred embodiment of the present invention.
Figure 4:
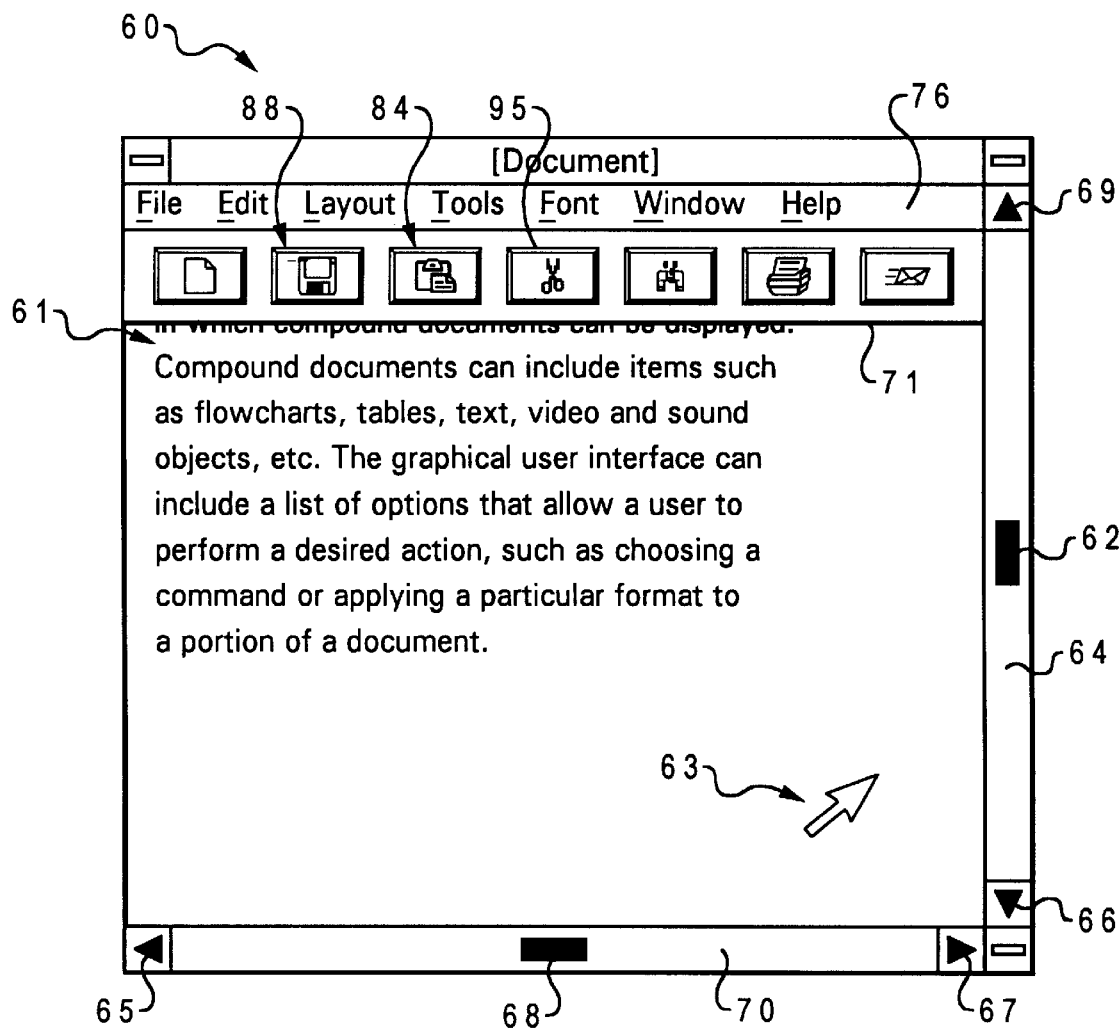
FIG. 4 depicts a pictorial representation of a graphical user interface window and a toolbar displayed within the graphical user interface window, in accordance with a preferred embodiment of the present invention.
Figure 5:
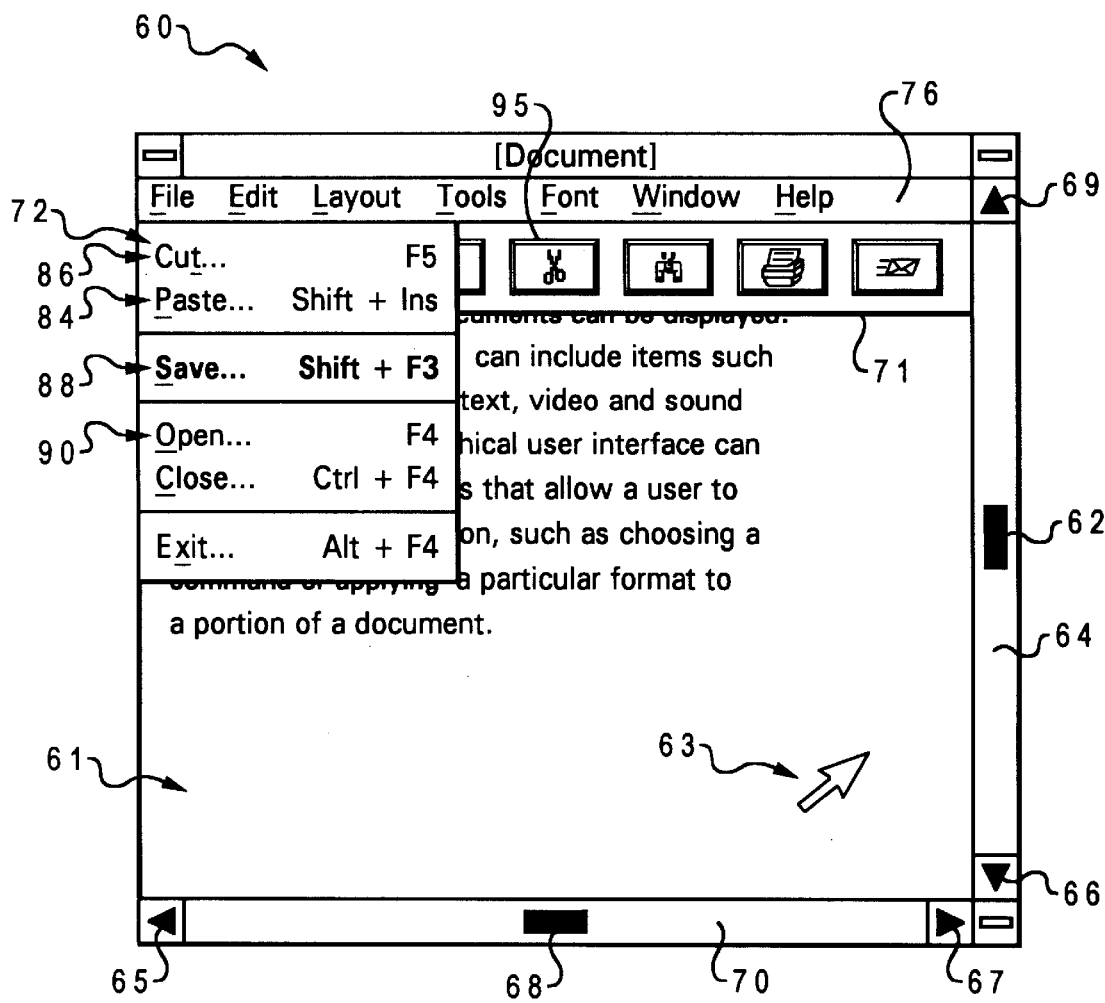
FIG. 5 depicts a pictorial representation of a graphical user interface window and a toolbar and menu displayed within the graphical user interface window, in accordance with a preferred embodiment of the present invention.

FIG. 3 illustrates a pictorial representation of a graphical user interface window 60 in accordance with the method and system of the present invention. In FIG. 3, FIG. 4, and FIG. 5, like parts are indicated by identical reference numerals. Window 60 displays a portion of a viewable object, such as a compound document 61. Window 60 is an area on the display screen of a visual display device such as video display 24 of FIG. 1 (a) that is utilized to present a view of an object or to conduct a dialog with a user. The visual display device may also be implemented as an LCD screen, such as those utilized in association "laptop" or "notebook" computers, such as computer system 21 of FIG. 1(b). Regardless of the type of visual display device utilized to display a particular graphical user interface window, such graphical user window "windows" can be utilized to present objects, action options, messages, and so forth.

Compound document 61 is a viewable object that can contain multiple components, such as spreadsheets, text, hotlinks, pictures, sound, and video objects. Examples of objects capable of running within the compound document include graphical representations, spreadsheets or a collection of text. In conventional graphical user interface window environments, a typical window displays a portion (e.g. a page) of a compound document. The size and position of the elevator within a window scroll bar corresponds to the size and position of the current viewable object in relation to the compound document. Because a compound document can include too large or too many objects to view simultaneously, the user can position a mouse cursor over an arrow section of the window scroll bar and click a pointing device (e.g. a mouse) to scroll the document upward or downward, as appropriate.

The size and position of slider 62 within scroll bar 64 corresponds to the size and position of the current viewable page in relation to compound document 61. The current viewable page is contained within a viewable window area within window 60. Window 60 also includes a menu bar 76. Menu bar 76 is a displayed rectangular bar from which menus can be selected by a user. Those skilled in the art will appreciate that compound document 61 is a document having multiple objects capable of running within the document such as spreadsheets, text, hotlinks, pictures, sounds, and video objects. Other examples of objects capable of running within a compound document such as compound document 61 include graphical representations, spreadsheets, or a collection of text. Names of available menus are displayed within menu bar 76. Choosing a particular menu in response to user input (e.g., mouse or keyboard user input) causes a list of options in the particular menu chosen to be displayed.

Because compound document 61 may include too many pages to view simultaneously, the user can position a mouse pointer 63 over up-arrow 69 or down-arrow 66 of scroll bar 64 and "click" a button on a pointing device, such as mouse 28 of FIG. 1(*a*), to scroll the document upward or downward, as appropriate. Scrolling in this manner permits viewing of any desired portion of compound document 61. Mouse pointer 63 is an on-screen element whose location changes as the user moves a mouse associated with mouse pointer 63. Depending on the location of mouse pointer 63 on a display screen, and the operation of the program within which it is working, the area of the screen where mouse pointer 63 appears serves as the target for an action when the user presses one of the mouse buttons.

Thus, mouse pointer 63, utilized in association with a mouse, such as mouse 28 of FIG. 1(*a*), allows a user to scroll compound document 61 upward or downward. Scrolling is essentially the electronic equivalent of reading through a rolled (i.e., "scrolled") document rather than flipping through pages of a book. Scroll bar 64 is thus a graphical user interface window component, associated with a scrollable area, that indicates to a user that more information is available in a particular direction and can be scrolled into view. Graphical user interface window 60 sizes slider 62 within vertical scroll bar 64 according to the number of pages in compound document 61. Slider 62 is a vertical slider. The length of slider 62 is small with respect to the length of vertical scroll bar 64 because it represents one of many pages of compound document 61.

The graphical user interface which implements window 60, positions slider 62 within vertical scroll bar 64 relative to the viewable position of compound document 61. For example, the graphical user interface positions slider 62 at the top of vertical scroll bar 64 when the user is viewing the first page of compound document 61, and at the bottom of vertical scroll bar 64 when the user is viewing the last page of compound document 61. Slider 62, located on vertical scroll bar 64, is defined to have a minimum size.

Window 60 also contains a horizontal scroll bar 70 that may be activated either by mouse clicking on left arrow 65, right arrow 67, or by dragging slider 68 right or left. Slider 68 is analogous to slider 62. However, slider 68 operations in a horizontal direction, while slider 62 operates in a vertical direction. Similarly, vertical scroll bar 64 may be activated either by mouse clicking on up-arrow 69, down-arrow 66, or by dragging the vertical slider 62.

FIG. 4 depicts a pictorial representation of a graphical user interface window 60 and a toolbar 71 displayed within graphical user interface window 60, in accordance with a preferred embodiment of the present invention. Within toolbar 71 is a displayed row of on-screen buttons or icons. When an on-screen button or icon maintained in a toolbar is "clicked," utilizing a pointing device such as a mouse, macros or particular functions of the application are activated. The toolbar may be customized by the user and moved about graphical user interface window 60 according to the user's preferences. For example, although toolbar 71 is displayed as a row of icons, toolbar 71 may also be displayed as a column or block of on-screen buttons or icons, depending upon the desires of a particular user. Examples of on-screen buttons or icons included within toolbar 71 include toolbar button 95 (i.e., a "cut" function), toolbar button 88 (i.e., a "save" function), and toolbar button 84 (i.e., a "paste" function). These and other toolbar buttons are described in greater detail in the text related to FIG. 6(*a*) and FIG. 6(*b*) herein.

FIG. 5 depicts a pictorial representation of a graphical user interface window 60, toolbar 71, and a displayed menu 72, in accordance with a preferred embodiment of the present invention. Menu 72 is a list of action, routing, and setting choices. Various types of menus may be implemented in accordance with a preferred embodiment of the present invention. For example, well-known types of menus include cascaded menus and "pop-up" menus. Menu 72 is a pull-down menu. A pull-down menu is a menu of related choices that extends from a selected choice on a menu bar or from a system-menu symbol, such as, for example, system-menu symbol "File," depicted in FIG. 3, FIG. 4, and FIG. 5.

Menu 72 provides predefined mnemonics for each predefined textual choice available within menu 72. For example, the textual choice "Cut" is a predefined mnemonic which initiates a "cutting" or deleting function. Associated with this function is a toolbar accelerator, in this case, toolbar accelerator 86, which is represented by the "F5" key. Other examples of toolbar accelerators include toolbar accelerator 84, which represents a "paste" function, toolbar accelerator 88, which represents a "save" function, and toolbar accelerator 90, which represents an "open" function. Consequently, the "open" function can be initiated by pressing the "F4" key, the "save" function can be initiated by pressing the keystroke combination of "shift+F3", and the "paste" function can be initiated by pressing the keystroke combination of "shift+Ins".

Figure 6A:
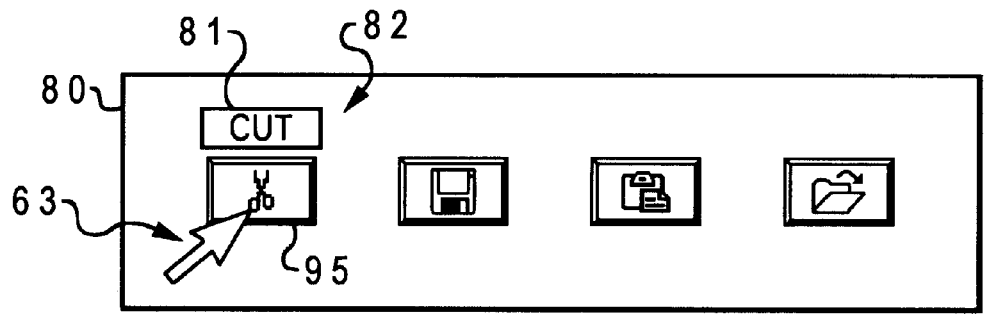
FIG. 6(a) illustrates a pictorial representation of a graphical user interface toolbar, including toolbar buttons and "flyover" help, in accordance with a preferred embodiment of the present invention.
Figure 6B:
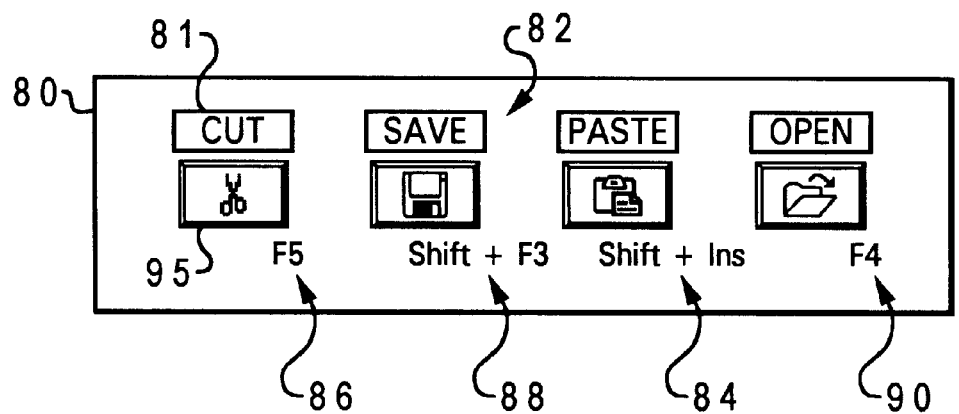
FIG. 6(b) depicts a pictorial representation of a graphical user interface toolbar, associated textually displayed toolbar accelerators, and "flyover" help, in accordance with a preferred embodiment of the present invention.

FIG. 6(*a*) illustrates a pictorial representation of a graphical user interface toolbar 80, including toolbar buttons and "flyover" help, in accordance with a preferred embodiment of the present invention. In FIG. 6(*a*) and FIG. 6(*b*), like parts are indicated by identical reference numerals. Toolbar 80 provides a set of graphical choices that represent tools. The tools (i.e., toolbar buttons 82) redefine the set of operations possible with a pointing device. Toolbar 80 is analogous to toolbar 71 of FIG. 4 and FIG. 5. Toolbar 80 is a shortened version of toolbar 71, containing fewer on-screen buttons. Those skilled in the art will appreciate, however, that toolbar 80 may be displayed within graphical user interface window 60.

Toolbar buttons 82 include different modes of the pointer (e.g., mouse pointer 63 of FIG. 3 and FIG. 5) that the user can select. For example, a "scissors" choice allows a user to "delete" particular objects or textual data displayed with a graphical user interface window, such as window 60 of FIG. 3 and FIG. 5. Toolbar 80 may be displayed within window 60 to assist a user in manipulating compound document 61. Toolbar 80 is thus a grouping of toolbar buttons that perform a common set of functionality within a particular application, such as a word processor.

When a user places mouse pointer 63 over a particular toolbar button, an on-screen "flyover" is displayed which indicates to the user the nature of the particular icon or toolbar button. For example, when mouse pointer 63 is placed over the "scissors" toolbar button 95, even for a brief moment, an on-screen flyover indicating the word "cut" is displayed for the user. Such flyovers assist a user in quickly determining the nature of the icon "touched" by mouse pointer 63. In FIG. 6(*a*), the "cut" flyover 81 associated with toolbar button 95 is displayed above toolbar button 95. However, those skilled in the art will appreciate that flyover 81 may also be displayed over or below toolbar button 95.

FIG. 6(*b*) depicts a pictorial representation of graphical user interface toolbar 80, associated textually displayed toolbar accelerators, and "flyover" help, in accordance with a preferred embodiment of the present invention. According to a preferred embodiment of the present invention, when a user provides a particular keystroke (e.g., a key such as the "F1" key), a "help mode" is initiated, wherein toolbar button accelerators and/or any associated "flyover help" are displayed for the user. The toolbar button accelerators are analogous to the toolbar accelerators depicted in FIG. 5. However, the toolbar button accelerators depicted in FIG. 6(*b*) are not restricted to a menu, and thus are not "hidden" and difficult to access when utilizing only a keyboard. If a user attempts to access the toolbar accelerators depicted in FIG. 5 without a pointing device, such toolbar accelerators are difficult to obtain due to the maneuverability problems described herein. Although the toolbar button accelerators depicted in FIG. 6(*b*) are analogous to the toolbar accelerators depicted in FIG. 5, the phrase "toolbar button accelerators" is utilized in association with FIG. 6(*b*) to indicate their relationship to the toolbar buttons (i.e., toolbar buttons 82) displayed within toolbar 80 of FIG. 6(*b*).

In addition to the display of the toolbar accelerators, associated flyovers may also be displayed as part of this "help model" initiated by the user. Depending upon a particular implementation of a preferred embodiment of the present invention, all of the help "flyovers" may be displayed simultaneously with all of the associated toolbar button accelerators. For example, in FIG. 6(*b*), flyover 81 is associated with toolbar button accelerator 86. A "save" flyover is associated with toolbar button accelerator 88, while a "paste" flyover, associated with toolbar button accelerator 84, is displayed above the "paste" toolbar button (i.e, icon) associated with toolbar button accelerator 84 (i.e., "shift+ins"). A similar configuration is implemented with an "open" flyover associated with toolbar button accelerator 90.

Thus, while in a "help mode," the toolbar button accelerators that can be utilized to trigger the toolbar buttons are transposed in textual form over or near an associated button icon image. For example, toolbar button accelerator 86, which initiates a "cut" function, is located adjacent the "cut" toolbar button. Toolbar button accelerator 88, which initiates a "save" function, is located adjacent the "save" toolbar button. Toolbar button accelerator 84, which initiates a "paste" function, is located adjacent the "paste" toolbar button. Toolbar button accelerator 90, which initiates an "open" function, is located adjacent the "open" toolbar button. Depending upon a particular implementation of a preferred embodiment of the present invention, any associated "flyover" help may also be displayed over or near the associated button icon image. Flyovers may or may be not be displayed in association with the toolbar button accelerators.

Thus, if a user does not have access to a pointing device such as a mouse, the user can still access the toolbars with the keyboard, utilizing the toolbar button accelerators, without the use of a pointing device. Without the presence of the toolbar button accelerators, chances are that the user would have a much more difficult time accessing the toolbar buttons. Thus, the keyboard user, for example, has a quick reference to the keyboard accelerators available without the need for excessive menu browsing, which is often a time-consuming and frustrating task.

Figure 7:
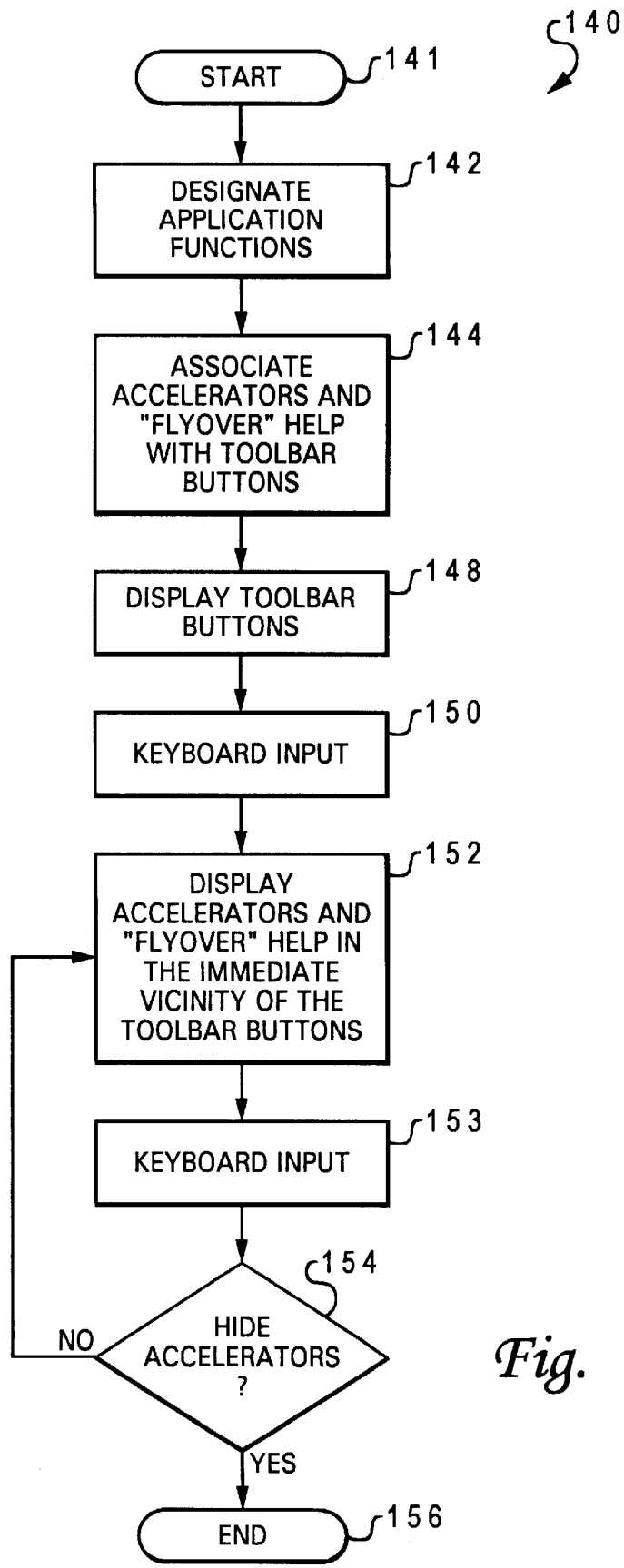
FIG. 7 depicts a flowchart of operations illustrating a method for the rapid access of toolbar buttons via toolbar accelerators, in accordance with a preferred embodiment of the present invention.

FIG. 7 depicts a flowchart of operations 140 illustrating a method for the rapid access of toolbar buttons via toolbar accelerators, in accordance with a preferred embodiment of the present invention. It can be appreciated by those skilled in the art that FIG. 7 presents a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer system 20 of FIG. 1(*a*) and FIG. 2, or computer system 21 of FIG. 1(*b*), in processing electrical or other (e.g. mechanical, chemical) physical signals to generate other desired physical signals.

Thus, as illustrated at block 141, the process is initiated. As indicated at block 142, application functions are designated, such as, for example, "cut," "delete," "save," and so forth. Thereafter, as depicted at block 144, accelerators and any "flyover" help are associated with the toolbar buttons to be displayed within a graphical user interface window such as window 60 of FIG. 3, FIG. 4, and FIG. 5. The accelerators allow a user to initiate a particular application function associated with a toolbar button without the use of a pointing device. As depicted at block 148, the toolbar buttons are then graphically displayed.

A particular user keyboard input, as described at block 150, results in the display of all accelerators and any associated flyover help, as thereafter depicted at block 152.

As indicated at block 152, in response to user input (i.e., via the keyboard), such as, for example, pressing an "F1" key, the accelerators and any associated "flyover" help are textually displayed in the immediate vicinity of their respective toolbar buttons. Following the display of the accelerators and any associated "flyover" help, the user may utilize the keyboard to access the toolbar buttons, as indicated at block 153. The user can thus access the toolbar buttons via the keyboard without resorting to utilizing a pointing device such as a mouse.

The displayed "flyover" help indicates to the user the type of toolbar buttons available, and the displayed accelerators allow the user quick access to the toolbars via the keyboard. Thereafter, as illustrated at block 154, a test is performed to determine whether or not to hide the accelerators from view. For example, pressing an "Esc" key can result in hiding the accelerators from view. If so, the process is terminated, as illustrated at block 156. If not, the operation described at block 152 is repeated.

While the invention has been particularly shown as described with reference to a preferred embodiment, it will be understood by those skilled in the art that various changes in form and detail may be made therein without departing from the spirit and scope of the invention. It is therefore contemplated that such modifications can be made without departing from the spirit or scope of the present invention as defined in the appended claims.

What is claimed is:

1. A method for selectably providing enhanced toolbar information in a graphical user interface of a data processing system, said method comprising:

displaying a graphical user interface (GUI) in a data processing system that is in communication with a keyboard having one or more keys;

displaying a toolbar that includes one or more toolbar buttons in said GUI, each of said toolbar buttons having an associated function and an associated keystroke sequence that initiates said associated function; and in response to a keystroke comprising depressing and releasing at least one predetermined key of said keyboard, displaying, proximal each and every toolbar button of said toolbar:

accelerator text that indicates the keystroke sequence associated with that toolbar button; and descriptive text that describes the function associated with that toolbar button.

2. A method according to claim 1, wherein said keystroke is a first keystroke, said method further comprising:

in response to a second keystroke comprising depressing and releasing at least one second predetermined key of said keyboard, removing all of said accelerator text and all of said descriptive text from said GUI.

3. A method according to claim 2, wherein said first keystroke and said second keystroke involve the same least one predetermined key.

4. A data processing system with a graphical user interface that selectably provides enhanced toolbar information, said data processing system comprising:

a processor, a display device in communication with said processor, and a keyboard having one or more keys in communication with said processor;

means for displaying a graphical user interface (GUI) in said display device, said GUI including a toolbar that includes one or more toolbar buttons, each of said toolbar buttons having an associated function and an associated keystroke sequence that initiates said associated function; and toolbar enhancement means, responsive to a keystroke comprising depressing and releasing at least one predetermined key of said keyboard, for displaying, proximal each and every toolbar button of said toolbar:

accelerator text that indicates the keystroke sequence associated with that toolbar button; and descriptive text that describes the function associated with that toolbar button.

5. A data processing system according to claim 4, wherein:

said keystroke is a first keystroke; and said toolbar enhancement means removes all of said accelerator text and all of said descriptive text from said GUI, in response to a second keystroke comprising depressing and releasing at least one second predetermined key of said keyboard.

6. A data processing system according to claim 5, wherein first keystroke and said second keystroke involve the same least one predetermined key.

7. A program product that selectably provides enhanced toolbar information in a graphical user interface, said program product comprising:

instructions that perform the following steps when executed by a processor of a data processing system displaying a graphical user interface (GUI), wherein said GUI includes a toolbar that includes one or more toolbar buttons, wherein each of said toolbar buttons has an associated function and an associated keystroke sequence that initiates said associated function, and wherein said data processing system is in communication with a keyboard having one or more keys:

in response to a keystroke comprising depressing and releasing at least one predetermined key of said keyboard, displaying, proximal each and every toolbar button of said toolbar:

accelerator text that indicates the keystroke sequence associated with that toolbar button; and descriptive text that describes the function associated with that toolbar button; and a computer usable medium encoding said instructions.

8. A program product according to claim 7, wherein:

said keystroke is a first keystroke; and said instructions remove all of said accelerator text and all of said descriptive text from said GUI, in response to a second keystroke comprising depressing and releasing at least one second predetermined key of said keyboard.

9. A program product according to claim 8, wherein said first keystroke and said second keystroke involve the same least one predetermined key.

* * * * *